United States Patent [19]
Chang

[11] Patent Number: 5,959,834
[45] Date of Patent: Sep. 28, 1999

[54] DISKDRIVE SLIDING CASE SYSTEM WITH LOCK AND POWER SWITCH

[76] Inventor: Cheng-Chun Chang, 11F-2, No. 11, Lane 202, Jing-Shing Rd., Wen-Shan DT, Taipei, Taiwan

[21] Appl. No.: 08/916,706

[22] Filed: Aug. 25, 1997

[51] Int. Cl.[6] .................................. G06F 1/16; H05K 5/02
[52] U.S. Cl. ............................................ 361/685; 361/726
[58] Field of Search .................................... 361/683–685, 361/724–727; 312/223.2, 332.1, 348.1–348.6; 439/928.1; 174/52.1

[56] References Cited

U.S. PATENT DOCUMENTS

| | | | |
|---|---|---|---|
| 5,379,184 | 1/1995 | Barraza et al. | 361/685 |
| 5,563,767 | 10/1996 | Chen | 361/685 |
| 5,694,290 | 12/1997 | Chang | 361/685 |
| 5,765,933 | 6/1998 | Paul et al. | 312/332.1 |
| 5,767,445 | 6/1998 | Wu | 174/52.1 |
| 5,797,667 | 8/1998 | Wu | 312/332.1 |

*Primary Examiner*—Lynn D. Feild
*Attorney, Agent, or Firm*—Dougherty & Troxell

[57] ABSTRACT

A diskdrive sliding case system including an outer case, an inner case inserted into the outer case and adapted to hold a diskdrive, and a switch and lock control device driven to turn on/off electric power supply and simultaneously to lock/unlock the inner case, wherein the switch and lock control device includes a power switch, a latch mounted in a through hole of the outer case, and a slide mounted in a front sliding hole of the outer case and coupled to the power switch and the latch, the power switch being switched on and the latch being moved out of the through hole of the outer case into engagement with a lock hole of the inner case when the slide is moved to a first position, the power switch being switched off and the latch being moved away from the lock hole of the inner case into the inside of the through hole of the outer case to unlock the inner case when the slide is moved to a second position.

1 Claim, 5 Drawing Sheets

DISKDRIVE SLIDING CASE SYSTEM WITH LOCK AND POWER SWITCH

BACKGROUND OF THE INVENTION

The present invention relates to a diskdrive sliding case system which includes a power switch and lock control device that turns off power supply and unlocks an inner case, which holds a diskdrive, when it is moved to a first position, or turns on power supply and locks the inner case when moved to a second position.

Various diskdrive sliding case systems have been disclosed for holding a diskdrive and for detachably mounting in a personal computer. A regular diskdrive sliding case system is generally comprised of an outer case with a lock, and an inner case detachably mounted in the outer case. When the inner case is mounted in the outer case, the lock of the outer case must be locked to prohibit the inner case from being pulled out of the outer case during the operation of the computer. If the lock of the outer case is not locked during the operation of the computer, the inner case may be pulled out of the outer case by an error, causing the disk or data in the disk to be damaged.

SUMMARY OF THE INVENTION

According to one aspect of the present invention, the diskdrive sliding case system comprises an outer case, an inner case inserted into the outer case and adapted to hold a diskdrive, and a switch and lock control device drive to turn on/off electric power supply and simultaneously to lock/unlock the inner case. The switch and lock control device comprises a power switch having a switch lever, a latch mounted in a through hole of the outer case, and a slide mounted in a front sliding hole of the outer case and coupled to the power switch and the latch. The slide comprises a coupling socket coupled to the switch lever of the power switch, and a coupling plate coupled to the latch. The power switch is switched on and the latch is moved out of the through hole of the outer case into engagement with a lock hole of a handle of the inner case when the slide is moved to a first position. The power switch is switched off and the latch is moved away from the lock hole of the handle of the inner case into the inside of the through hole of the outer case when the slide is moved to a second position. According to another aspect of the present invention, the inner case comprises an open front side, two vertical coupling flanges and two vertical coupling grooves respectively disposed at its two opposite vertical side walls, and a face panel detachably closed on the open front side. The face panel has two vertical coupling grooves and two vertical coupling flanges at its back side respectively forced into engagement with the vertical coupling flanges and vertical coupling grooves of the vertical side walls of the inner case. According to still another aspect of the present invention, the face panel has a center opening, and a cover plate detachably covered on the center opening.

DETAILED DESCRIPTION OF THE PREFERRED EMBODIMENT

Figure 1A:
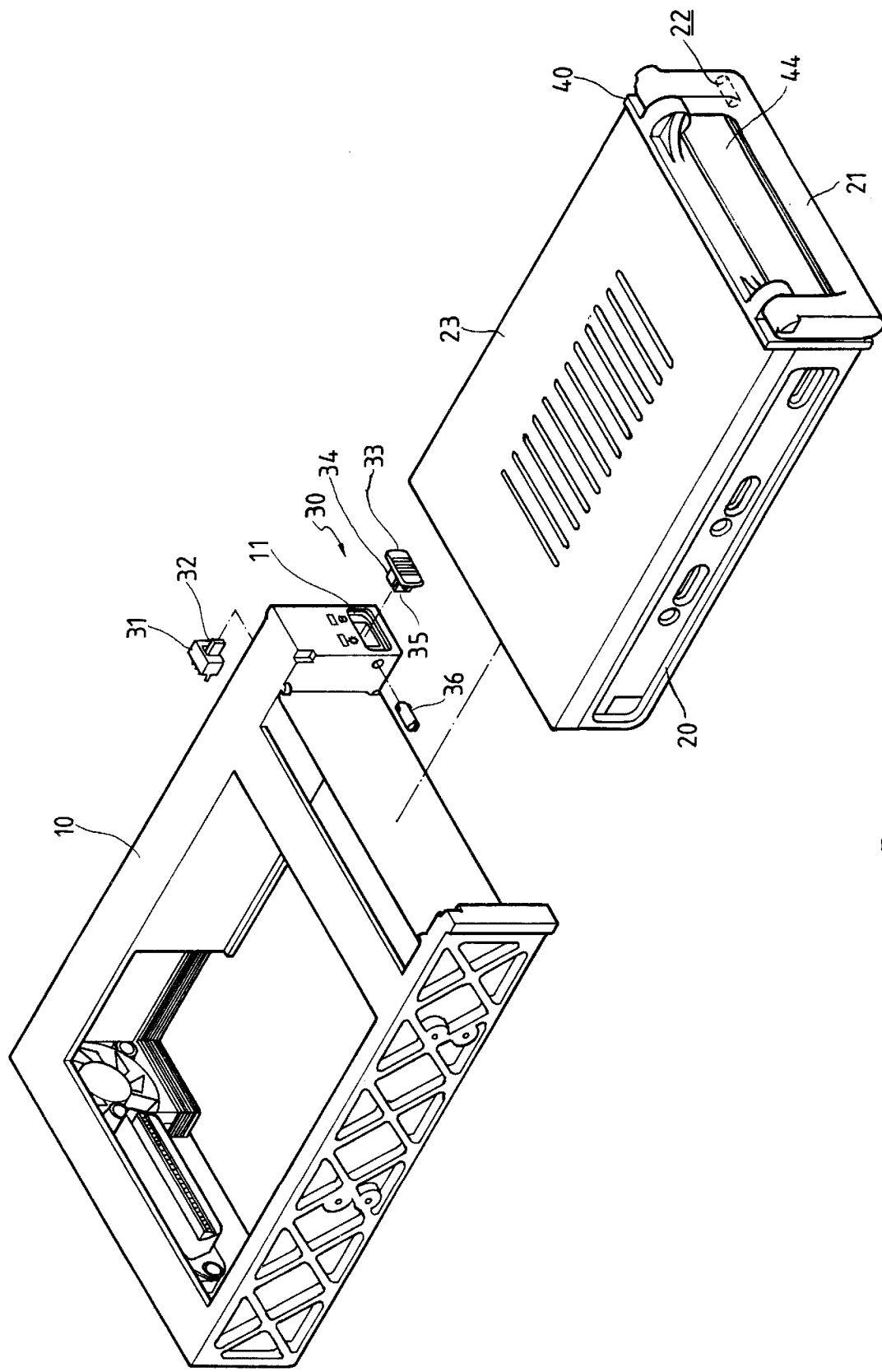
FIG. 1A is an exploded view of a diskdrive sliding case system according to the present invention.
Figure 1B:
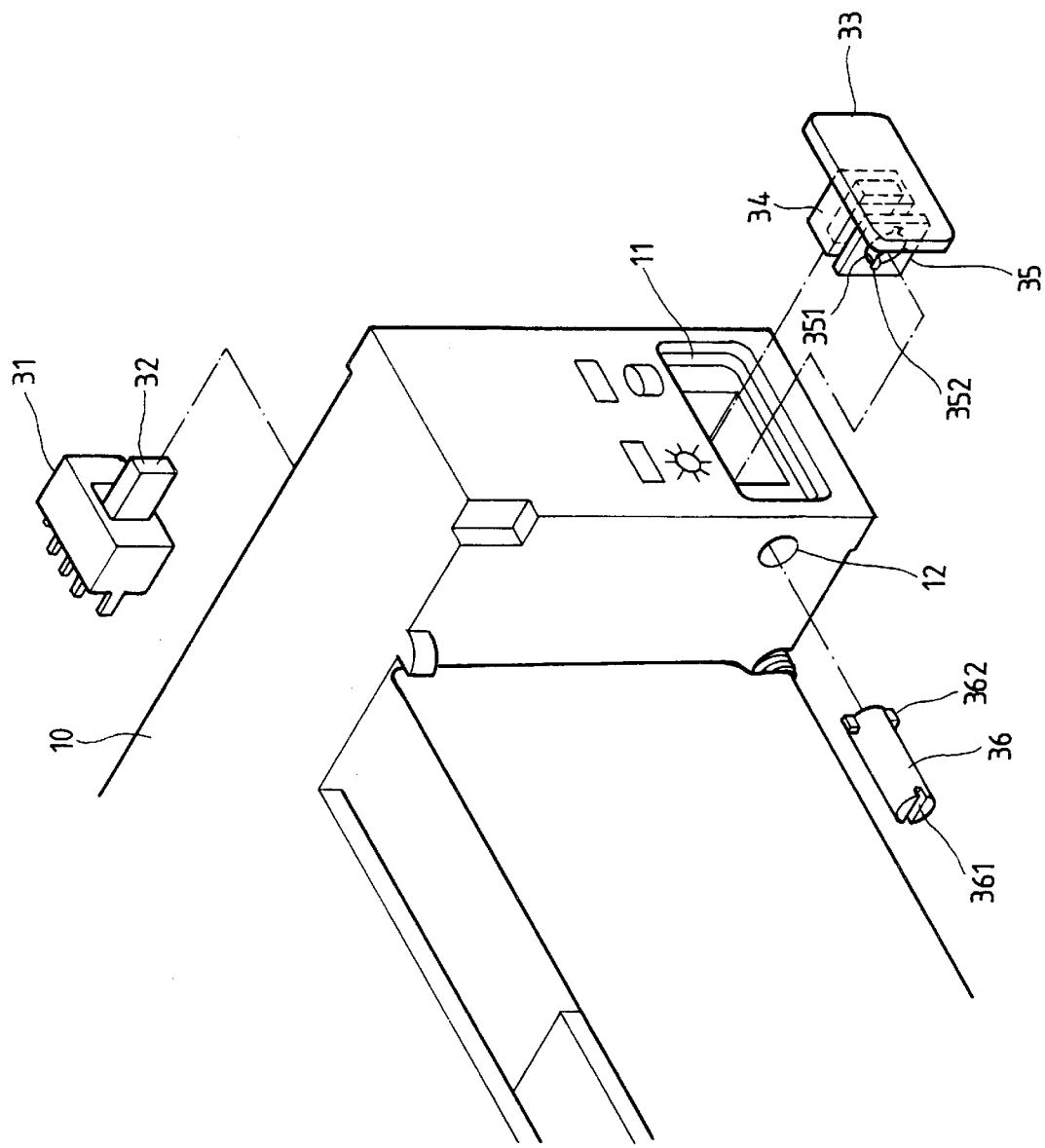
FIG. 1B is an exploded view of the switch and lock control device according to the present invention.

Referring to FIGS. 1A and 1B, a diskdrive sliding case system in accordance with the present invention is generally comprised of an inner case 20 adapted for sliding a diskdrive, an outer case 10 adapted to hold the inner case 20, and a switch and lock control device 30 mounted in the inner case 20 at its front side. The outer case 10 comprises a front sliding hole 11, and a through hole 12 disposed in communication with the front sliding hole 11. the switch and lock control device 30 comprises a power switch 31 connected to power contacts and having a switch lever 32, a latch 36 mounted in the through hole 12, and a slide 33 slidably mounted within the front sliding hole 11 and driven to switch on/off the power switch 31 and simultaneously to move the latch 36 in and out of the through hole 12. The slide 33 comprises a coupling socket 34 and a coupling plate 35 arranged in parallel and perpendicularly raised from its back side. The coupling socket 34 is fastened to the switch lever 32 of the power switch 31, for permitting the switch lever 32 to be moved leftward or rightward with slide 33. The coupling plate 35 has a mounting hole 351 fitting the outer diameter of the latch 36, and two notches 352 radially extended from the mounting hole 351 in reversed directions. The latch 36 has a transverse groove 361 at one end, and two projecting flanges 362 bilaterally raised from its periphery at an opposite end. The projecting flanges 362 fit the notches 352. When the projecting flanges 362 of the latch 36 are respectively aligned with the notches 352 of the coupling plate 35 of the slide 33, the latch 36 can then be inserted into the mounting hole 351. After the latch 36 have been inserted into the mounting hole 351, a screwdriver or the like is attached to the transverse groove 361 turned at a certain angle, for permitting the projecting flanges 362 of the latch 36 to be retained between the coupling plate 35 and the coupling socket 34 outside the mounting hole 351.

Figure 2A:
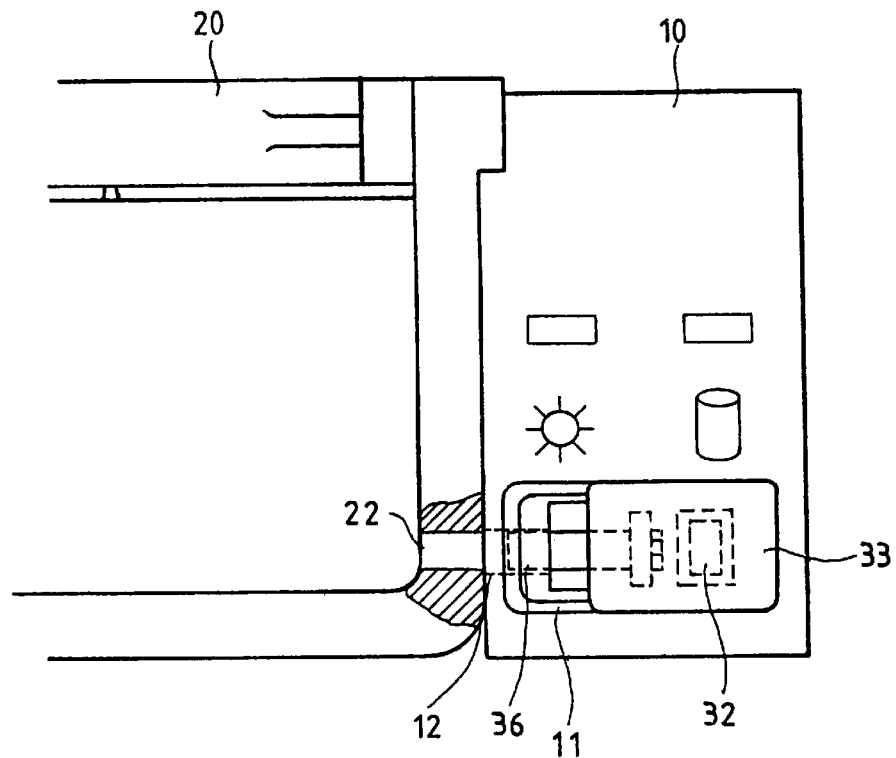
FIG. 2A is a plain view of a part of the present invention, showing the switch and lock control device moved to the off position.
Figure 2B:
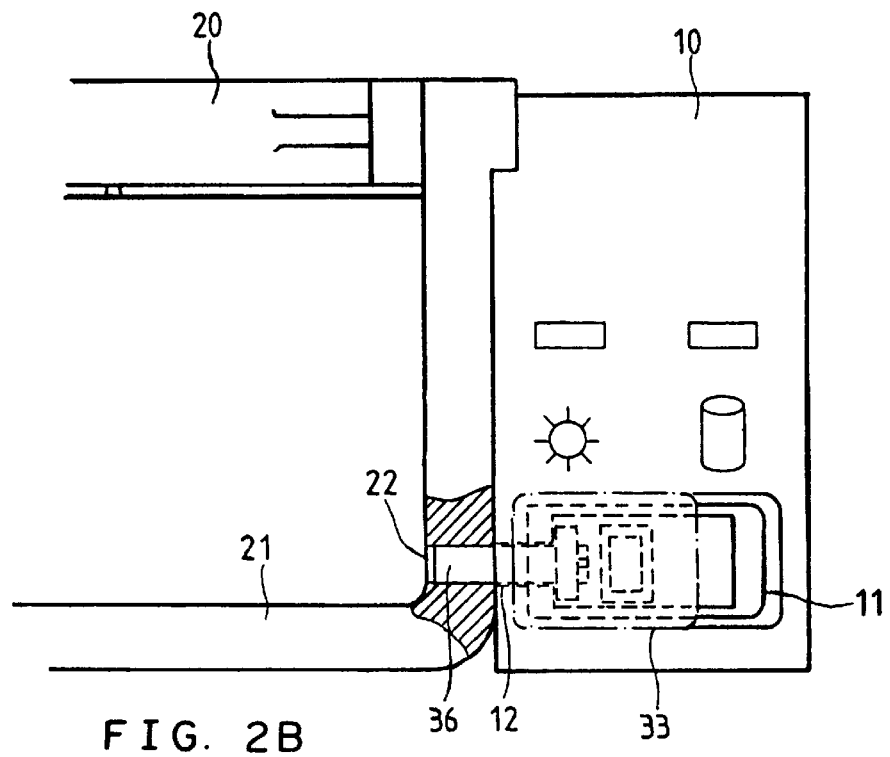
FIG. 2B is similar to FIG. 2A but showing the switch and lock control device moved to the on position.

Referring to FIGS. 2A and 2B, when the inner case 20 is inserted into the outer case 10, the slide 33 is moved leftwards to switch on the power switch 31 and simultaneously to force the latch 36 out of the through hole 12 into a lock hole 22 in a handle 21 of the inner case 20. When the power switch 31 is switched on and the latch 36 is forced into the lock hole 22 of the handle 21 of the inner case 20, electric power supply is connected to the diskdrive in the inner case 20, and at the same time the handle 21 of the inner case 20 is locked, and therefore the inner case 20 cannot be pulled out of the outer case 10 (see FIG. 2B). On the contrary, when the slide 33 is moved rightwards to switch off the power switch 31 and to move the latch 36 away from the lock hole 22 of the handle 21 of the inner case 20 into the inside of the through hole 12, electric power supply is cut off from the diskdrive, and the inner case 20 is unlocked and allowed to be pulled out of the outer case 10 (see FIG. 2A).

Figure 3:
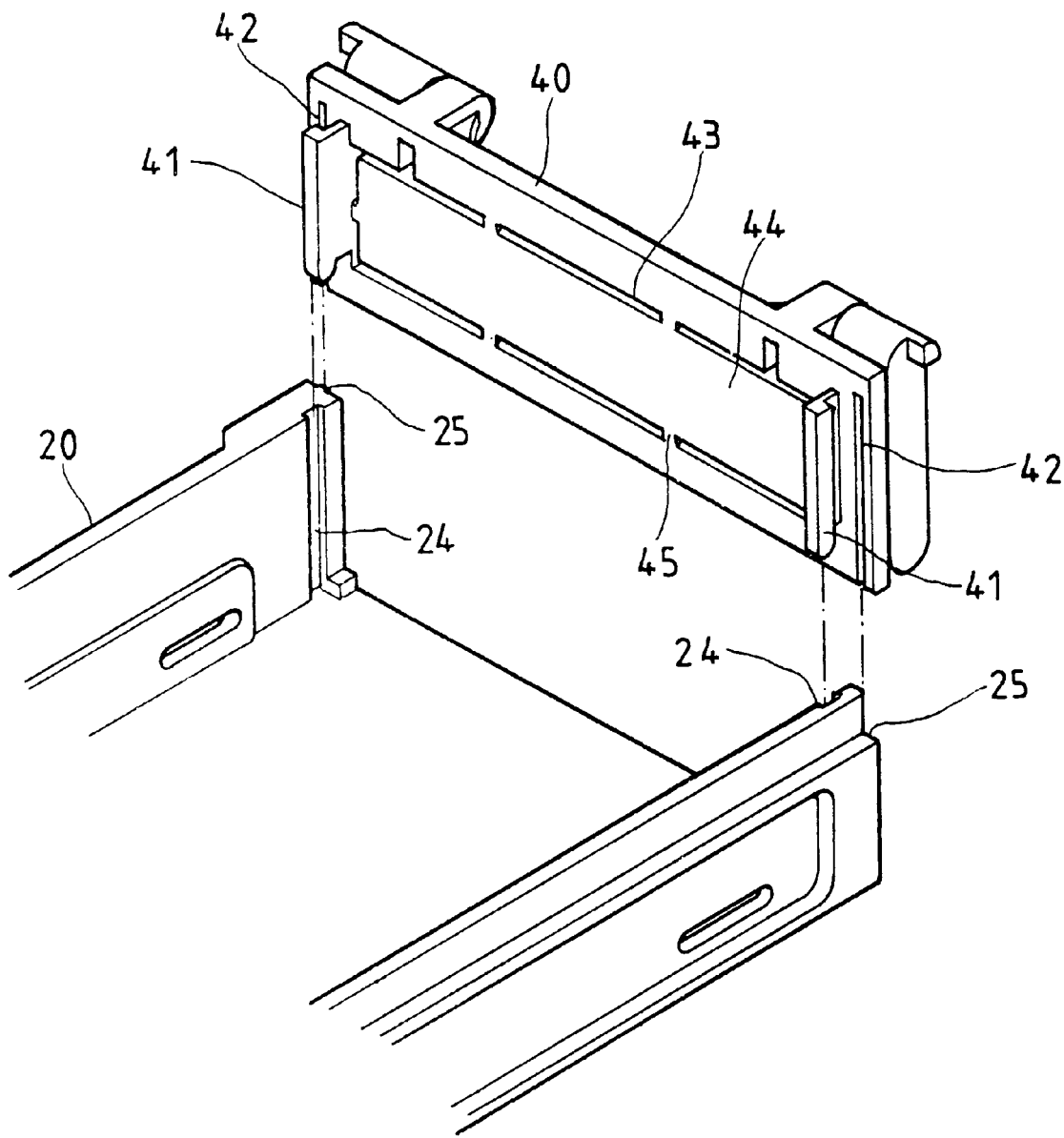
FIG. 3 is an exploded view of a part of the inner case, showing the face panel disconnected from the inner case according to the present invention.

Referring to FIG. 3 and FIG. 1A again, the inner case 20 has an open top side covered with a top cover panel 23, and an open front side mounted with a face panel 40. The inner case 20 comprises two vertical coupling grooves 24 bilaterally disposed in its open front side, and two vertical coupling flanges 25 respectively disposed in front of the vertical coupling grooves 24. The face panel 40 comprises two vertical coupling grooves 42 bilaterally disposed at its back side and respectively forced into engagement with the vertical coupling flanges 25 of the inner case 20, and two vertical coupling flanges 41 bilaterally raised from its back side and respectively forced into engagement with the vertical coupling grooves 24 of the inner case 20. By pulling the face panel 40 upwards from the inner case 20, the vertical coupling flanges 41 and vertical coupling grooves 42 of the face panel 40 are respectively disengaged from the vertical coupling grooves 24 and coupling flanges 25 of the inner case 20, and therefore the face panel 40 and the inner case 20 are disconnected from each other.

Figure 4:
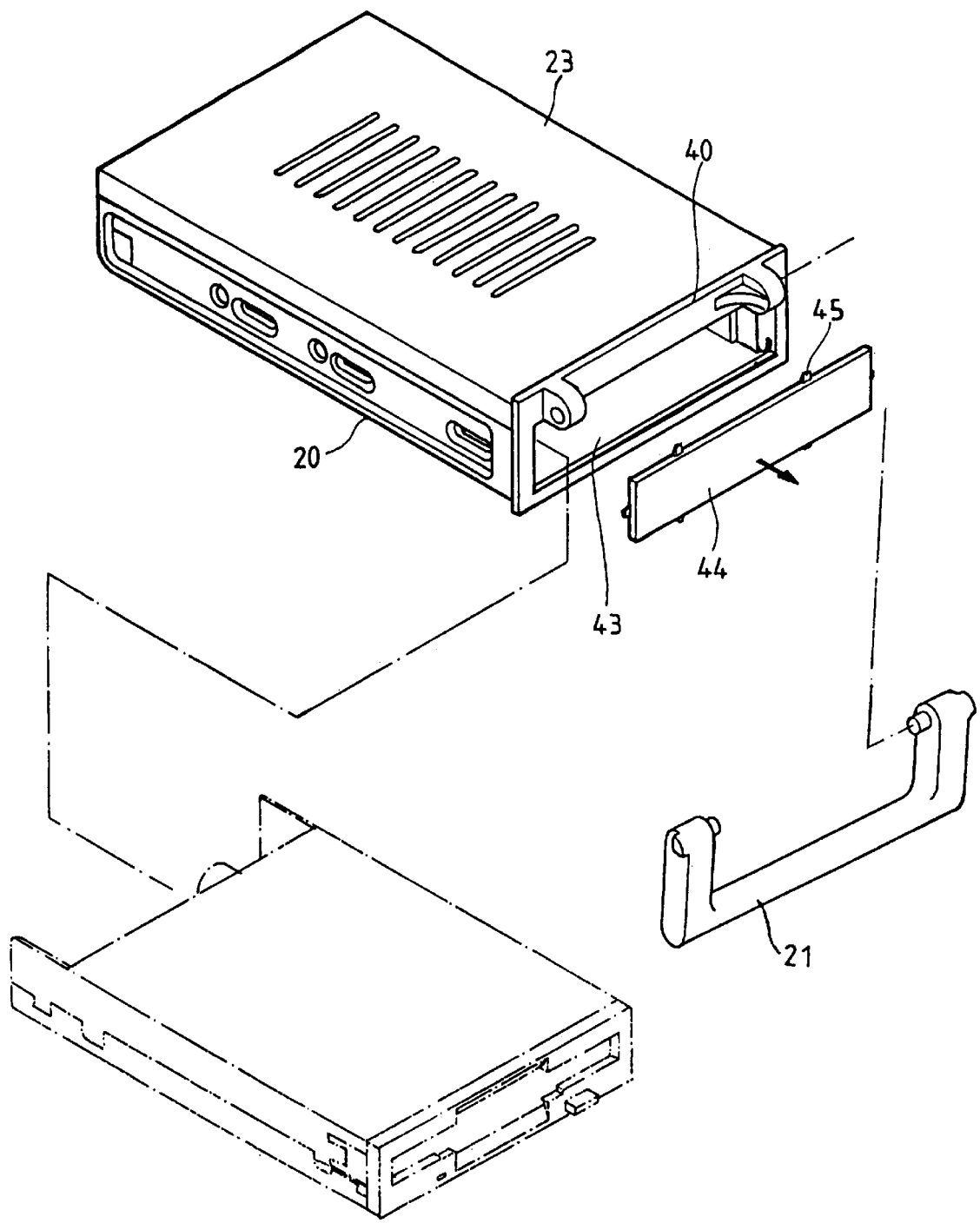
FIG. 4 shows the cover plate disconnected from the face panel and the handle disconnected from the inner case according to the present invention.

Referring to FIG. 4 and FIG. 3 again, the face panel 40 has a center opening 43, and a cover plate 44 covered on the center opening 43. The cover plate 44 has projecting stub rods 45 spaced around its border. By forcing the projecting stub rods 45 of the cover plate 44 into engagement with respective back notches (not shown) of the face panel 40, the cover plate 44 is fastened to the face panel 40 to close its center opening 43. When the inner case 20 is mounted with a hard diskdrive, the cover plate 44 is covered on the center opening 43 of the face panel 40 to seal up the inner case 20. When a floppy diskdrive is installed in the inner case 20, the cover plate 44 is removed from the face panel 40, so that a computer disk can be inserted into the floppy diskdrive.

It is to be understood that the drawings are designed for purposes of illustration only, and are not intended as a definition of the limits and scope of the invention disclosed.

What the invention claimed is:

1. A diskdrive sliding case system comprising an outer case, and an inner case inserted into said outer case and adapted to hold a diskdrive, said inner case having a front side and a handle pivoted to its front side, wherein:

said outer case comprises a front sliding hole at one side, and a through hole disposed in communication with said front sliding hole;

said inner case comprises a lock hole at one side of its handle corresponding to the through hole of said outer case, an open front side, two vertical side walls, and a face panel covered on its open front side, said two vertical side walls having a respective vertical coupling groove and a respective vertical coupling flange, said face panel comprising two vertical coupling flanges and two vertical coupling grooves respectively forced into engagement with the vertical coupling grooves and vertical coupling flanges of said vertical side walls, a center opening, and a cover plate covered on said center opening;

a switch and lock control device is mounted in said front sliding hole of said outer case to control electric power supply and to lock said inner case in said outer case, said power switch and lock control device comprising a power switch having a switch lever, a latch mounted in said through hole of said outer case, and a slide mounted in said front sliding hole of said outer case and coupled to said power switch and said latch, said slide comprising a coupling socket coupled to the switch lever of said power switch, and a coupling plate coupled to said latch, said power switch being switched on and said latch being moved out of the through hole of said outer case into engagement with the lock hole of said handle of said inner case when said slide is moved to a first position, said power switch being switched off and said latch being moved away from the lock hole of said handle of said inner case into the inside of the through hole of said outer case when said slide is moved to a second position.

* * * * *